United States Patent Office 3,452,376
Patented July 1, 1969

3,452,376
METHOD AND DEVICE FOR BOOKBINDING
Akira Ito, 4—10 Yushima 2-chome, Tokyo, Japan
Filed Mar. 2, 1967, Ser. No. 620,128
Int. Cl. B42c *19/00;* B21d *39/00;* B23p *11/00*
U.S. Cl. 11—1                                9 Claims

ABSTRACT OF THE DISCLOSURE

A method and apparatus for binding a stack of papers in which a stack of papers secured in a tightening device is placed on a base with a bored hole in the stack in alignment with a recess in the base. A solid tack of thermoplastic material is supported in the hole in the stack and a head of the tack is received in the recess. The opposite end of the tack is cut so that an end portion of predetermined length of the tack protrudes from the hole. The protruding end of the tack is then heated by a pivotably mounted heating member which is brought into operative position and thereby the end of the tack is softened and a plastic mass is formed thereat. Subsequently, the heating member is displaced to an inoperative position and a molding member is moved to operative position and the molding member molds the head under pressure while concurrently cooling the mass to solidify the same and form a substantially hemispherical head binding the other side of the stack of papers.

---

This invention relates to a method and device for bookbinding, and more particularly to a method and device for binding vouchers, bills, magazines or other paper material by means of thermoplastic tacks.

It is frequently necessary to join a plurality of paper materials as referred to above. For instance, vouchers and bills of an extended period, e.g. one year, are preferably stored in the bound state in a shop. Also, in libraries twelve monthly magazines are preferably joined in one volume. Conventional binding methods include a method with a Hotchkiss paper fastener or stapler, hemp thread bindings, metal wire bindings and specialized stitching process.

The Hotchkiss paper fasteners have disadvantages in that a metallic staple is not suitable for binding a book or a file of paper thicker than 1 cm. Moreover such metallic staple is apt to be stained, and papers bound by such a fine staple are easily torn. The hemp thread bindings have the disadvantages in that it needs special experience and skill to install, it takes much time to complete the binding, and the use of thin hemp threads tends to cause tearing of the papers bound thereby. The metal wire bindings have disadvantages similar to those of the aforesaid Hotchkiss stapler, namely the metal wires are apt to rust or cause paper tearing. The stitching process provides good binding effects, but the bound edge of each file should be solidified by applying adhesives after stitching, and specialized skill is necessary for successful binding. Accordingly, such stitching process has been used only by professional bookbinders on an industrial mass production basis. Unskilled office workers cannot make accurate and complete binding quickly according to this stitching process.

Furthermore, since the conventional binding materials which have been utilized heretofore are substantially nonelastic or inextensible, it is difficult to turn the bound pages and to read information close to the binding portions when papers are joined to a considerable thickness. Moreover, such conventional binding materials are not suitable for joining papers in a manner which enables copying any selected pages thereof, because copying devices, such as photographic and photoelectronic copying devices, require a planar disposition of the page being copied, and such planar disposition cannot be provided with the aforesaid conventional binding materials.

A principal object of the present invention is to provide novel method and device for binding papers capable of obviating the aforementioned difficulties of the conventional binding processes, with the use of thermoplastic tacks.

An object of the present invention is to provide a method and device for binding printed papers in a desired thickness easily, quickly, and without any particular skill.

Another object of the present invention is to provide a method of bookbinding for producing attractive and durable books without damage to the papers thereof, which books can be easily disassembled.

Other objects and various advantages of the present invention will become evident from the following detailed description, taken in conjunction with the accompanying drawing illustrating a preferred embodiment of the invention, in which:

FIG. 3 is an enlarged fragmentary sectional view, illustrating details of the radiator of a heater usable in the device of FIG. 1;

FIG. 4 is a sectional view, showing an example of a press mold for shaping, usable in the device of FIG. 1;

FIG. 5 is a perspective view of a paper tightening device;

FIG. 6 is an enlarged sectional view of a nut to be used in the paper tightening device of FIG. 5;

Figure 7:
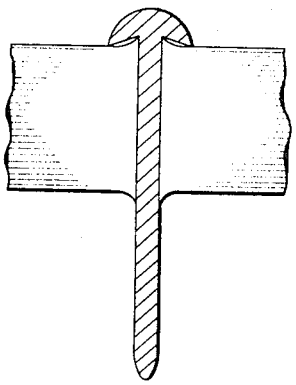
FIG. 7 is a diagrammatic illustration of a tack and papers bound thereby.
Figure 8:
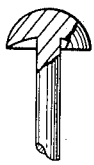
FIGS. 8 and 9 are part-sectional views of modified configurations of the tack.
Figure 9:
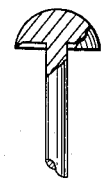

According to the present invention, papers to be bound are stacked and aligned along one side thereof. Then the papers are tightened and drilled. Usually two holes are preferably drilled. Then a tack made of thermoplastic material, e.g. polyethylene is inserted in said hole. The tack is preferably formed with a head at one end thereof as shown in FIGS. 7, 8 or 9 although this is not necessary. The head previously formed is made concave at the under face thereof so as to closely fit the protruded portion naturally formed by drilling the papers. Several lengths of tacks are supplied by Aisyo Company Limited and a length should be selected so as to correspond approximately to the desired thickness of the papers which are to be bound. The other end of the tack extending out of the hole is cut so as to leave a suitable length which is softened by heating and formed into a hemispherical head by molding and cooling. Then the joined papers are released from the tightening means and bound firmly between two end heads.

The bookbinding device according to the present invention will be described hereinafter.

Figure 1:
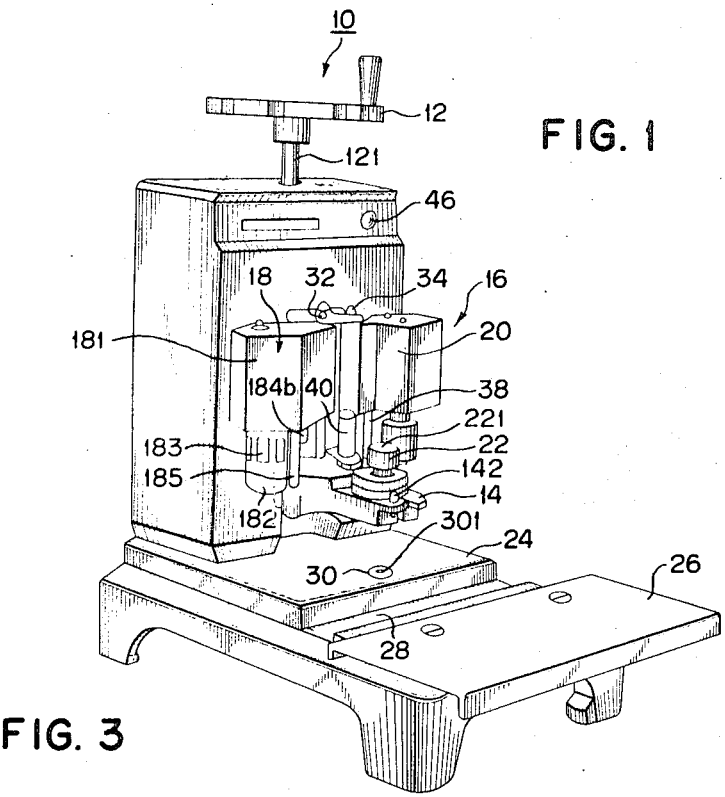
FIG. 1 is a perspective view of a bookbinding device embodying the present invention.
Figure 2:
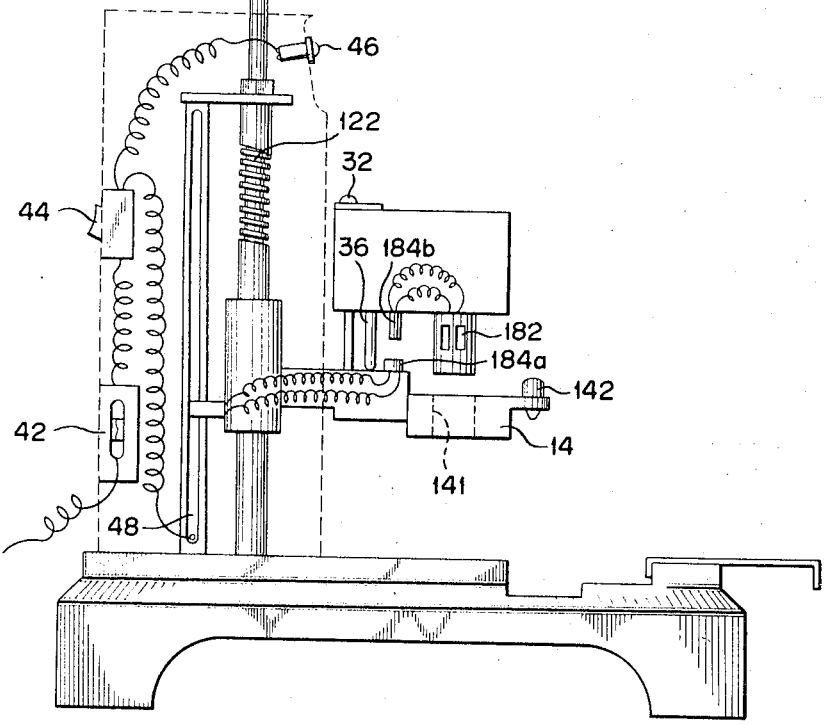
FIG. 2 is a schematic side view illustrating internal electric wiring of the device of FIG. 1.

Referring to FIGS. 1 and 2, the device generally designated by reference numeral 10, is used together with a paper tightening or fastening device 50 as shown in FIG. 5. A handle 12 is interconnected with a fastening arm 14 through a connecting rod 121 and a screw member 122, which fastening arm supports a heater 18 and a tack shaping device 16, and by turning the handle 12, both the tack shaping device 16 and the fastening arm 14 can be vertically reciprocated. A tack cutter 22 acts to cut a tack inserted through a slot 221 at a desired length. A base 24 is adapted to receive the paper fastening device 50 in a receiving groove 28 formed thereon, and it is preferable to place the base 24 somewhat lower than a second base 26. The base 24 is also provided with a recess 30 having a groove 301 bored at the central portion thereof.

The heater 18 and a radiator 20 are supported by pins 32 and 34 respectively in a horizontally pivotable manner, and are normally urged upwards by springs (not shown) mounted on guide levers 36, 38. A cover 40 for the heater output terminal can be swung to the right, FIG. 1, upon forward rotation of the heater 18, by means of a heater holder 181. A heater cover 185 can be removed when a heater radiator 182 of the heater 18 having inspection windows 183 for inspecting molten condition of a tack is pivoted to a position above an opening 141 (FIG. 2) of the fastening arm 14 after removing the tack cutter 22 from the opening 141, and then output terminal 184a (FIG. 2) is fully exposed, so as to be ready for making contact with heater input terminal 184b (FIG. 2) upon depression of the heater 18 against the elastic force of a spring mounted on the guide lever 36. The tack cutter 22 is shown as fitted in the opening 141 in FIG. 1.

The output terminal 184a is connected to an electric power source (not shown) through a safety fuse 42, a main switch 44, and an electric conductor 48, as shown in FIG. 2. There is provided a pilot lamp 46 to be energized through the switch 44 for indication of the ON-OFF conditions of the main switch 44.

The heating portion of the heater 18 may be comprised of an electrically insulating member 182a made of porcelain or the like and a heating member 182b made of, for instance, Nichrome wires, as illustrated in FIG. 3. Lead wires A, B are passed through a pair of small holes bored therefor on the insulating member 182a, and connected to the heating member 182b at one end thereof and to the input terminal 184b at the opposite end thereof. In the particular embodiment of the invention illustrated in FIG. 3, the heating member 182b consists of three layers of coiled wires, but the present invention is not restricted to such structure and the heating member 182b can be made of more or less than three layers of coiled wires, or one or more heating plates. Such modifications are apparent to those skilled in the art and is within the scope of the present invention.

Figure 13:
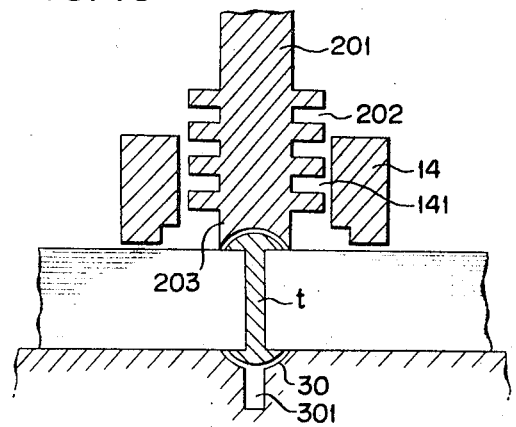
FIG. 13 is a schematic sectional view of a modified press mold placed at a position for shaping a head of the tack.

FIG. 4 shows an example of a press mold 20 usable in the method of binding according to the present invention. The press mold comprises a support stem 201, a heat radiator 202, and a tack molding portion 203. In this particular example of the press mold, in order to facilitate quick dissipation of heat transferred thereto from a tack through the tack molding portion 203, a suitable coolant c, such as water, is sealed therein or is filled therein in a sealable manner, and both the outer wall and the surface of a central stem connected to the tack shaping portion are corrugated. In the case of a compact press mold for shaping small tacks, such coolant c is not necessary, and for instance, the coolant can be substituted by fins, as illustrated in the modified form of FIG. 13.

In binding printed papers with the aforementioned devices according to the present invention, it is preferable to align the papers to be bound together by using a suitable paper fastening device, as shown in FIG. 5, prior to the binding itself. The paper fastening device generally designated by 50 comprises an upper fastening plate 52, a lower fastening plate 54 having screw threaded bolts 56, 58 secured thereto, and nuts 60, 62 threaded on said bolts. The upper and lower fastening plates respectively include hollow rectangular members 52a and 54a together with plate members 52b and 54b. A plurality of small holes 64 are bored on the rectangular member 52a so as to fix the fastening device 50 firmly in position by receiving a pin 142 (FIG. 1) attached to the fastening arm 14 of the body 10 when the device 50 is fitted in the groove 28 of the body. With the rectangular member 52a thus fixed, papers can be aligned with the aid of plate members 52b, 54b extending from the rectangular members. After completion of alignment of the paper between the upper and the lower fastening plates 52 and 54, the papers are tightly clamped by tightening the nuts 60, 62 on the threaded bolts 56, 58, respectively.

Generally speaking, the nuts are provided with tapped threads on the cylindrical inside surface thereof, however, such tapped threads are not suitable for fastening a small quantity of paper quickly. Therefore, the nut has the special form as shown in FIG. 6. Therein is shown the construction of nut 60, it being understood that nut 62 is of the same construction. The nut 60 has a threaded portion 601, a non-threaded portion 602, and a projected guide portion 603 engageable with a recessed portion (not shown) formed on the upper fastening plate 52, and the threaded hole side 603b of the projected guide portion 603 has a larger mass than the non-threaded side 603a thereof. Thus, the nut 60 can be moved quickly along the screwed bolt 56 without rotation by taking advantage of the non-threaded hole 602, as long as the projected guide portion 603 is not engaged with a recess formed on the upper fastening plate 52. On the other hand, when the projected guide portion 603 of the nut 60 is fitted in the recess of the upper fastening plate 52, then the threaded hole 601 of the nut is brought into engagement with the screw threads of the bolt 56, and upon rotation of the nut, the nut 60 is vertically moved. As long as the projected guide portion 603 is fitted in the recess of the upper fastening plate 52, the threaded hole side 603b of the guide portion 603 is kept in contact with the inner cylindrical peripheral surface of the recess, in order to keep the threaded hole 601 in constant engagement with the threaded screw of the bolt 56.

The process of fastening papers with such paper fastening device is very important for removing kinks or waviness of the paper and for subsequent boring holes therethrough. Holes of the size corresponding to the tacks to be used are bored in the paper in the state as fastened by such paper fastening device 50 at suitable positions by means of a drill (not shown). After raising the fastening arm 14 upwards by turning the handle 12, the papers as fastened by the fastening device 50 are placed on the bookbinding device 10 of FIG. 1, while placing the fastening device 50 in the receiving groove 28 of the binding device 10 and aligning the holes of the paper with the slot 301 of the recess 30 of the binding device 10. Upon completion of the alignment, the handle 12 is rotated in the reverse direction to lower the fastening arm 14 downwards. If it is desired to use a tack t having a bevel head, such tack should be inserted beforehand through the hole bored in the papers being bound, the tack-head should be located in the recess 30 of the base 24.

When a stack of paper is drilled to form a hole, the upper and lower end layers of such stack are generally raised, as shown in FIG. 7, and accordingly, the inside surface of the head portion of the tack t should preferably be recessed, conically shaped, or shaped in the form of a circular truncated cone, as illustrated in FIGS. 7 to 9. The tack t can be made of any thermoplastic material, and comparatively soft thermoplastic resins are suitable for preventing damage to the paper being bound, and more particularly, polyethylene resin is preferable due to its excellent stability and its relative softness.

Figure 10:
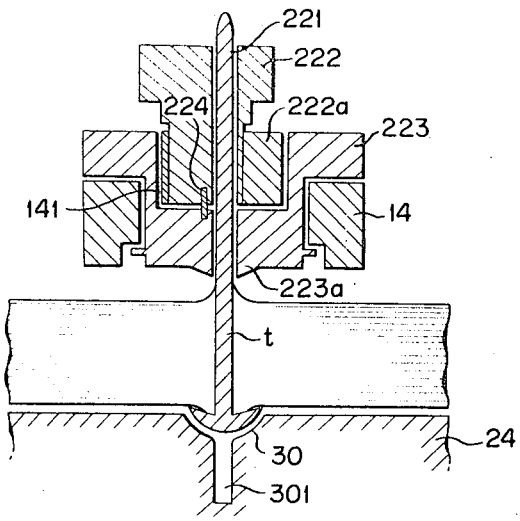
FIG. 10 is an enlarged sectionl view, showing a cutter usable in the device of FIG. 1, together with a tack.

Then, a tack cutter 22 is mounted on the binding device 10, as shown in FIG. 10, to cut the tack t to a length suitable for forming a bevel head thereon. The end portion of each hole bored in the paper to be bound is raised, as described above, and if a bevel head is formed without treating such raised portion, there will be produced a gap between the tack and the paper, which leads to an undesirable loose binding of the paper. In order to eliminate such difficulty, there is provided in the tack cutter 22 of the present invention, a projection 223a (FIG. 10) at the lower end of a guide member 223 having a rotary member 222 and a rotary member receiver 222a. The rotary member is supported by the guide member 223 at a pin 224 and rotatable in an eccentric manner. By depressing the tack cutter 22 against the paper prior to cutting the tack t, the above raised portion of the paper can be reduced or diminished.

Figure 11:
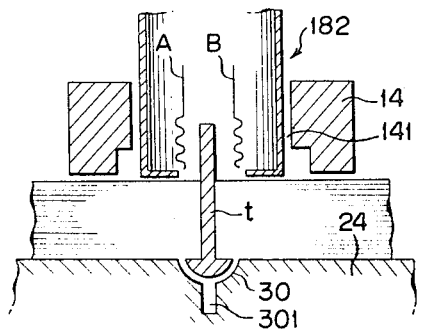
FIGS. 11 and 12 are simplified diagrammatic illustrations in section of tacks to be plasticized upon heating, in conjunction with a heater therefor.
Figure 12:
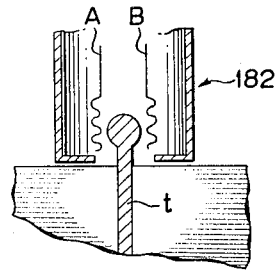

After cutting the tack t, the tack cutter 22 is removed from the opening 141 of the fastening arm 14, and the heater 18 is pivotally moved to the end of its forward stroke, whereat the heater 18 is aligned with the opening 141. The heater 18 is then depressed against the elastic force of a spring mounted on the guide member 36, and the input terminal 184b is engaged with the output terminal 184a (see FIGS. 1 and 2). Thus, heat is generated in the heating portion 182, and the tack t is gradually softened and plasticized, as shown in schematic form in FIGS. 11 and 12. Such softened and plasticized conditions can be inspected by the operator through the windows 183 (see FIG. 1), and when the tack t is heated to the plasticized and swollen conditions shown in FIG. 12, the operator returns the heater to the position as shown in FIG. 1 by removing his hands therefrom. Thereafter, the operator moves the press molds forwards without any delay, and depresses it in the same manner as the heater 18. While the press mold 40 is held at the position shown in FIG. 13, the heat for shaping and hardening is dissipated through the shaping mold 203 and fins 202, and the head portion of the tack is formed.

By repeating such insertion of tacks and molding them in the aforementioned manner, the bookbinding process is accomplished.

If it is desired to use a tack t without a head at one end thereof, i.e. a cord tack, the hole bored in the paper fastening device 50 is aligned with the slot 301 of the base 24 of the binding device 10 and then the cutter 22 is mounted on the device 10, and a cord tack is inserted through the hole of the paper by means of a slot 221 of the tack cutter until the lower end of the cord tack strikes the bottom of the slot 301. Then, the upper end of the cord tack is cut off by the cutter 22, melted, and shaped into a head. Thereafter, the paper is removed from the fastening device, turned upside down, and fastened again in the device 50, so that the opposite end of the tack t may be also heated, melted, and shaped. Thus, bookbinding can also be carried out with such cord tacks.

By inserting a front cover and a back cover at the top and bottom of the stack in the aforementioned bookbinding process, and/or by applying a shoulder cover upon completion of the aforesaid bookbinding process, if so desired, an attractive book can be prepared.

Figure 14A:
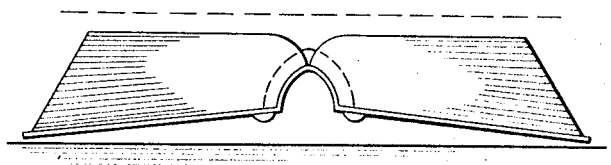
FIGS. 14a and 14b are diagrammatic illustrations of the manner in which a book bound according to the method of the present invention and another book bound by a conventional method are opened respectively, for showing the improvement achieved by the present invention.
Figure 14B:
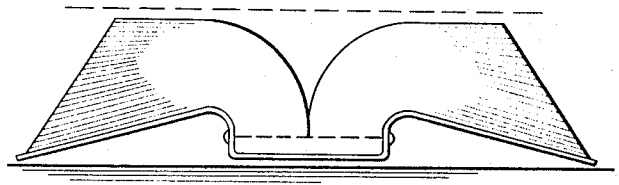

The books and files prepared by the method of the present invention, especially those made by using polyethylene tacks, can be opened very widely so as to expose the entire page in a planar fashion due to the flexibility of the tack, as illustrated in FIG. 14a. It is apparent from comparison of FIG. 14a and FIG. 14b, showing a book bound by a conventional method, that the present invention presents a considerable improvement over the conventional method of bookbinding.

The heating time and shaping time for molding the tack head vary depending on the material and size of the tack to be treated. For instance, in the case of a tack of about 3 mm. dia., the heating time is about 20 to 30 seconds, and the molding time is about 15 to 20 seconds.

Furthermore, the paper bound by the method of the present invention can be easily disassembled without damage to the paper by cutting the tack at the lower end of the head by means of a razor blade or the like, and by thereafter removing the tack from the paper.

Although the present invention has been described with a certain degree of particularity, it is understood that the present disclosure has been made only by way of example and that numerous changes in details of construction and the combination and arrangement of parts may be resorted to without departing from the spirit and the scope of the invention as hereinafter claimed.

I claim:

1. A device for binding papers in a book comprising a base on which papers to be bound are placed, said papers being bored with at least one hole in which a protruding tack is inserted, means for cutting the end of said track protruding from the hole to leave a predetermined exposed length, means for heating and softening said exposed length of the tack comprising a cover member of thermally and electrically insulating material and an electrical heating member circumferentially arranged within said cover member to radiate heat to said exposed length of the tack, and metallic block means for press molding said softened tack end and for solidifying the same to form a substantially hemispherical head on said tack.

2. A device as set forth in claim 1 in which said metallic block means comprises a metallic block member having a concave surface at the lower end thereof for forming said hemispherical head.

3. A device as set forth in claim 2 in which said metallic block member includes fins for promotion of the thermal radiation.

4. A device as set forth in claim 2 in which said metallic block member is provided with a chamber therein in which a coolant medium is filled.

5. A device as claimed in claim 2 comprising an arm supported by said base for displacement in opposite directions, and pins secured to said arm for travel therewith, said pins supporting said heating member and block member for respective pivotal movement between operative and inoperative positions, each of said members in the operative position being located in alignment with the tack in the hole in said stack of papers.

6. A device as set forth in claim 5 comprising means for holding the stack of papers in tightened condition including an upper bar having two holes at opposite ends thereof, a lower bar having opposite ends and two externally threaded rods thereat adapted to be respectively inserted in said holes of the upper bar, and two nuts for respectively engaging said threaded rods whereby stacked papers to be bound may be tightened between said two bars by turning said nuts on said threaded rods, said base having a transversely extending groove in which said lower bar of the tightening means is receivable so that the lower face of the papers may overlie the base, said base further having a concave cavity to receive a lower head of the tack inserted in the hole of said papers, said concave cavity being in alignment with the operative position of said heating member and said block member respectively.

7. A device as set forth in claim 6 in which each said nut has two partly overlapping longitudinal grooves, one of said grooves having a smooth inner wall while the other groove is threaded so that said nut may engage said threaded rod with said threaded groove but may slidably move along said threaded rod when the smooth groove is engaged therewith.

8. A device as set forth in claim 5 in which said heating member and block member are respectively slidably supported on their associated pins to be displaceable thereon so that an operative end portion of each member can be brought into proximity with the free end of the protruding tack when such member is in its operative position.

9. A method for binding a stack of papers comprising stacking, aligning and tightening papers to be bound, boring at least one hole through the tightened, stacked papers, inserting through said hole a solid tack of thermoplastic material having a preformed head at one end with a concave under-surface to accommodate a locally protruding portion of the stack around the hole produced by the boring of said hole, cutting said tack so that an end portion of the tack, remote from the preformed head, protrudes from the hole, heating the protruding end of the tack to soften the same and form a plastic mass at the end of the tack, molding the plastic mass under pressure while concurrently cooling the mass to solidify the same to form a substantially hemispherical head binding the side of the stack of papers remote from the preformed head, and applying pressure to a locally protruding portion on the side of the stack opposite said preformed head, in the region of the hole, to diminish such portion prior to the formation of the hemispherical head.

References Cited

UNITED STATES PATENTS

| | | |
|---|---|---|
| 1,652,724 | 12/1927 | McBee. |
| 1,697,327 | 1/1929 | Roe. |
| 1,744,923 | 1/1930 | Roe. |
| 3,025,082 | 3/1962 | Toulmin _____ 281—21 |

LAWRENCE CHARLES, *Primary Examiner.*

U.S. Cl. X.R.

29—509, 526